United States Patent [19]

Yamada et al.

[11] Patent Number: 4,996,640

[45] Date of Patent: Feb. 26, 1991

[54] DATA PROCESSING SYSTEM

[75] Inventors: Shiro Yamada, Kasugai; Keiichi Hirata, Kuwana; Minoru Oishi, Nagoya; Yoshinari Morimoto, Nagoya; Akihiro Furukawa, Nagoya; Atsuko Kawasumi, Nagoya, all of Japan

[73] Assignee: Brother Kogyo Kabushiki Kaisha, Japan

[21] Appl. No.: 111,692

[22] Filed: Oct. 21, 1987

[30] Foreign Application Priority Data

Oct. 24, 1986 [JP] Japan .................. 61-254323

[51] Int. Cl.⁵ .............................. G06F 3/14
[52] U.S. Cl. .................. 364/200; 364/232.9; 364/225.6; 364/225.8
[58] Field of Search ... 364/200 MS File, 900 MS File

[56] References Cited

U.S. PATENT DOCUMENTS

| | | | |
|---|---|---|---|
| 4,080,659 | 3/1978 | Francini | 364/200 |
| 4,118,695 | 10/1978 | Ogawa et al. | 364/900 |
| 4,247,906 | 1/1981 | Corwin et al. | 364/900 |
| 4,357,680 | 11/1982 | Greek, Jr. et al. | 364/900 |
| 4,403,301 | 9/1983 | Fessel | 364/900 |
| 4,458,311 | 7/1984 | Clements et al. | 364/200 |
| 4,458,331 | 7/1984 | Amezcua et al. | 364/900 |
| 4,545,015 | 10/1985 | Baunach et al. | 364/200 |
| 4,587,634 | 5/1986 | Ferrio et al. | 364/900 |

Primary Examiner—Michael R. Fleming
Assistant Examiner—Debra A. Chun
Attorney, Agent, or Firm—Kane Dalsimer Sullivan Kurucz Eisele Levy Richard

[57] ABSTRACT

A data processing system capable of processing data in a plurality of modes including an input/edit mode is disclosed. The system includes a data name memory, start address memory and edit condition memory wherein the status of data being processed in the input/edit mode is stored when processing in the input/edit mode is interrupted to enable processing in a different mode and based upon which the system resumes processing in the input/edit mode.

21 Claims, 3 Drawing Sheets

DATA PROCESSING SYSTEM

BACKGROUND OF THE INVENTION

This invention relates to a data processing system capable of running at least under a data input mode, and more particularly to a system wherein the data input mode can be interrupted to be changed to other data processing modes such as a delete mode, a print mode and so on as required, and restored the input mode as being before interrupted when returned to the input mode.

A data processing system generally runs under a plurality of data processing modes including a word processor mode for preparing and/or editing data files within a text memory, a print mode for printing a content of a selected data file stored in the text memory, and a list mode for displaying a list of data files stored in the text memory as well as for deleting a selected data file from the text memory. These modes are indicated on a display screen in the form of menu so as to allow an operator to select a desired mode with a cursor.

In such data processing systems, it has been necessary to leave the currently selected mode in order to change the proceesing mode, which requires a series of bothersome operations.

In view of the above, there has been proposed such data processing devices as being designed to be changable the processing modes without the operations to leave the currently selected mode. In other words, with these data processing systems, mere operation for chaning the processing mode causes automatic leaving from the currently processed mode and entry into the newly selected mode.

With the above constructed systems, however, as the current mode is terminated upon change of the mode, the processing being executed at the time of mode-change under the currently selected mode is automatically cancelled. Accordingly, it becomes necessary to re-entry several data and take some preparatory operations so as to resume the above processing when the currently selected mode is re-selected after the required processings under the newly selected mode finished.

SUMMARY OF THE INVENTION

It is therefore an object of the invention to provide an improved data processing system capable of resuming the interrupted processing being executed under the processing mode selected before changing the processing mode.

For the above purpose, according to the present invention, there is provided a data processing system comprising:

mode change means for interrupting a processing being executed under a currently selected mode and changing processing modes to a newly selected one;

data memory means for saving required data for resuming the interrupted processing; and resuming means for resuming the interrupted processing based upon said data saved in said data memory means when said currently selected mode is reselected.

With the above constructed system, as deta memory means for saving required data for resuming the interrupted processing being executed under the currently selected mode is provided, the interrupted processing can be resumed when the currently selected mode is re-selected after the required processings under the newly selected mode finished.

Optionally, the data processing system of the present invention may comprise:

data file memory means for storing a plurality of data files;

mode change means for changing processing modes at least between a data input mode for storing input data in said data file memory means and a delete mode for deleting a selected data file stored in said data file memory means and rearranging addresses of remaining data files in said data file memory means;

access data memory means for storing an address corresponding to an access position in the data file being processed under said data input mode;

address data memory means for storing a data indicating a start address of said data file being processed under said data input mode in said data file memory means;

revising means for correspondingly revising said data stored in said address data memory means if the start address of said data file is changed during the processing under said delete mode; and resuming means for resuming the processing being executed under the previous data input mode based upon the data stored in said address data memory means and said access data memory means when the mode is returned to the data input mode from other mode by said mode change means.

With the above constructed data processing system, such data are automatically saved in corresponding memory means, when the processing mode is changed to other one during the processing executed under the data input mode, as the start address of the data file being processed in the data file memory means and the address of the access position in the data file. Then, when the mode is brought back to the data input mode, the processing being executed under the previous data input mode is automatically resumed based upon the data stored as above. Accordingly, mode changes can be carried out at any time without cancelling the ongoing operations such as data input and various editing processings. Further, as soon as the data input mode is re-selected, the processing can be re-opened at the position interrupted, which results in better operability and more flexibility as well as more prompt processings in different modes.

DESCRIPTION OF THE ACCOMPANYING DRAWINGS

DESCRIPTION OF THE PREFERRED EMBODIMENT

Figure 1:
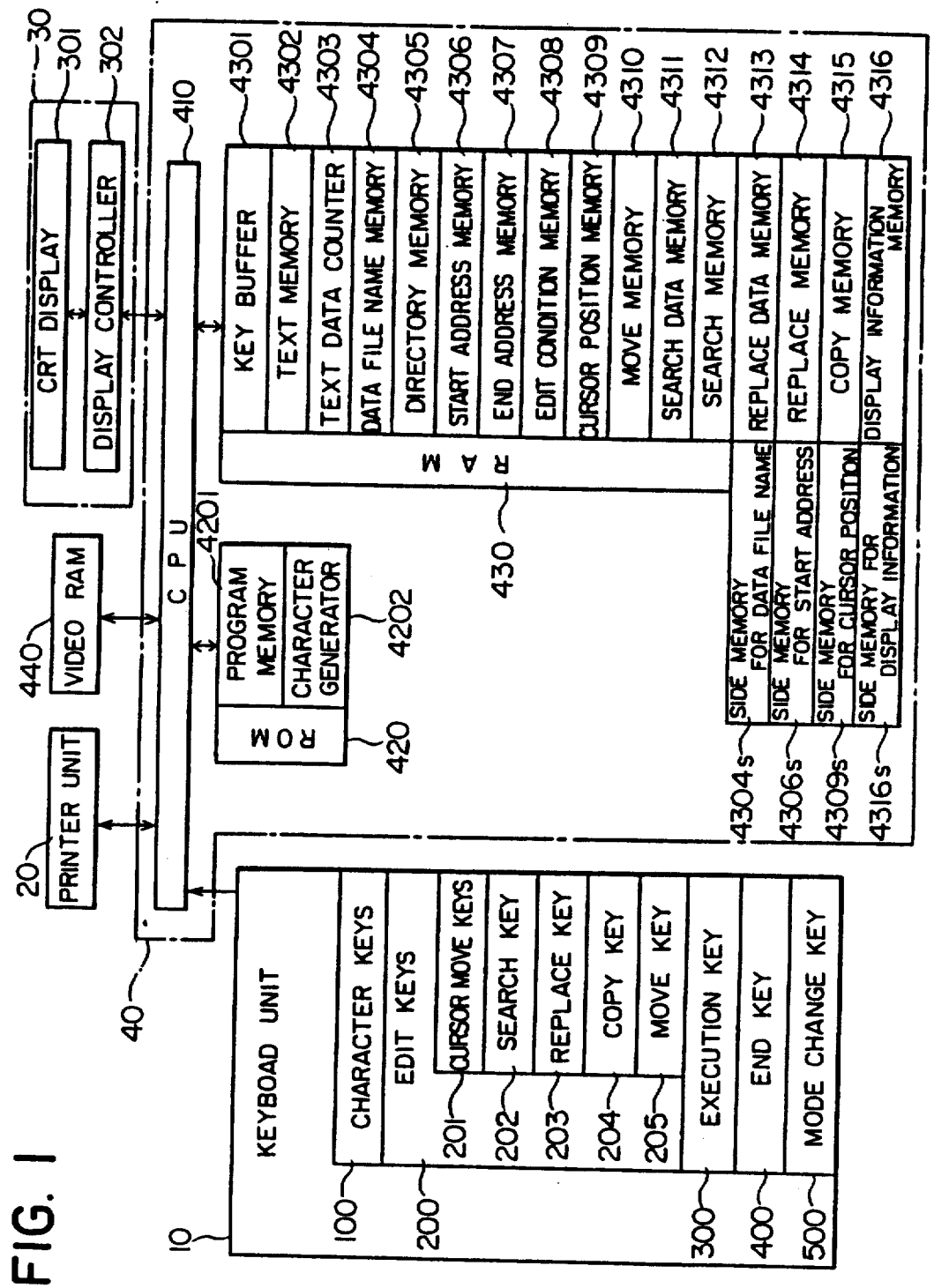
FIG. 1 is a block diagram showing an English word processor embodying the invention.

FIG. 1 shows a functional block diagram of an English word processor embodying the invention, which fundamentally comprises a keyboard unit 10, a printer unit 20, a display unit 30 and a control unit 40.

The keyboard unit 10 is provided with a plurality of keys including:
- a set of character keys 100 such as alpha/symbol keys and numeric keys for entry of character data,
- a set of edit keys 200 including cursor move keys 201 for moving a cursor on a display screen, a search key 202 for searching certain data within a data file, a replace key 203 for converting data in a data file to other data, a copy key 204 for copying data in a designated area to a desired location, a move key 205 for moving data within the designated area to a desired location,
- an execution key 300 for excuting a processing selected by pressing other keys,
- an end key 400 for terminating processing, and
- a mode change key 500 for selecting processing modes.

The printer unit 20 basically comprises, although not illustrated in the drawings, a carriage carrying a type wheel and corresponding parts for printing characters and/or symbols according to code data transferred from the control unit 40, and a paper feed mechanism for feeding a printing paper also according to instructions transferred from the control unit 40.

The display unit 30 comprises a CRT (Cathode Ray Tube) display 301 and a display controller 302 for feeding control signals to the CRT display 301 in accordance with instructions transferred from the control unit 40.

The control unit 40 basically comprises a CPU (Central Processing Unit) 410, a ROM (Read Only Memory) 420, and a RAM (Random Access Memory) 430. Connected to the CPU 40 are the keyboard unit 10, the printer unit 20, the display controller 302, a video RAM 440, the ROM 420 and the RAM 430.

The video RAM 440 is provided with a data memory capacity corresponding to one screen of the CRT display 301 for storing code data of characters and/or symbols in accordance with display positions thereof.

The ROM 420 is provided with a program memory 4201 wherein contained are:
- control programs for regulating the printer unit 20 and the display unit 30,
- control programs for regulating data processings under a word processor mode (an input/edit mode: hereinafter referred to as WP mode), a print mode, a delete mode and a typewriter mode, respectively, and
- a control program for regulating mode changes as described later.

The ROM 420 is also provided with a character generator 4202 wherein character/symbol patterns are stored for displaYing them on the CRT display 301.

In the RAM 430, defined are a plurality of memory areas including:
- a key buffer 4301 for temporarily storing several data input through the keyboard unit 10,
- a text memory 4302 for storing whole data sequentially output from the key buffer 4301 as data file,
- a text data counter 4303 for sequentially indicating a position (address) in the text memory 4302 where an input data is to be entried,
- a data file name memory 4304 for saving a name of a data file currently read out from the text memory 4302 to be processed,
- a directory memory 4305 for retaining an order of data files and a data volume of each data file,
- a start address memory 4306 for saving a start address of a data file currently read out from the text memory 4302,
- an end address memory 4307 for saving an end address of a data file, a start address thereof is stored in the start address memory 4306,
- an edit condition memory 4308 for saving edit condition of copying, replacing, searching and other editing functions at the time when mode change is carried out without pressing the end key 400,
- a cursor position memory 4309 for saving a cursor position based upon line and column data in the video RAM 440 in terms of an address starting from a start address of a currently processed data file in the text memory 4302,
- a move memory 4310 for saving a starting position of an area to be moved when the move key 205 is operated in terms of an address starting from a start address of a currently processed data file in the text memory 4302,
- a search data memory 4311 for saving data to be searched,
- a search memory 4312 for saving a start address of the last searched data, when the search key 202 is operated, in terms of an address starting from a start address of a currently processed data file in the text memory 4302,
- a replace data memory 4313 for saving data to be replaced,
- a replace memory 4314 for saving a last replaced position, when the replace key 203 is operated for replacing designated data, in terms of an address starting from a start address of a currently processed data file in the text memory 4302,
- a copy memory 4315 for saving a starting position of a copying area, when the copy key 204 is operated, in terms of an address starting from a start address of a currently processed data file in the text memory 4302,
- a display information memory 4316 for saving start and end addresses of an area currently displayed on the CRT display 301, when the mode change key 500 is operated without pressing the end key 400, based upon the data within the video RAM 440 in terms of addresses starting from a start address of a currently processed data file in the text memory 4302, and
- a series of side memories, provided for avoiding confusions with the data in other modes than the WP mode when mode change takes place, for saving a data file name (4304s), a start address (4306s). a cursor position (4309s) and display informations (4316s).

Besides the above buffers and/or memories, defined in the RAM 430 are a number of memories for temporarily saving the data required to control the printer unit 20 and the display unit 30.

The CPU 410 functions, when the character keys 100 on the keyboard unit 10 are pressed, to store the code data corresponding to the pressed character keys sequentially into the text memory 4302 of the RAM 430, while to read out the pattern data corresponding to these code data one after another from the character generator 4202 of the ROM 420 and transfer them to the display controller 302 to display them on the screen of the CRT display 301. Further, the CPU 410 functions, when corresponding keys on the keyboard unit 10 are operated, to execute the corresponding processings in accordance with the control programs read out of the program memory 4201 of the ROM 420.

Figure 2:
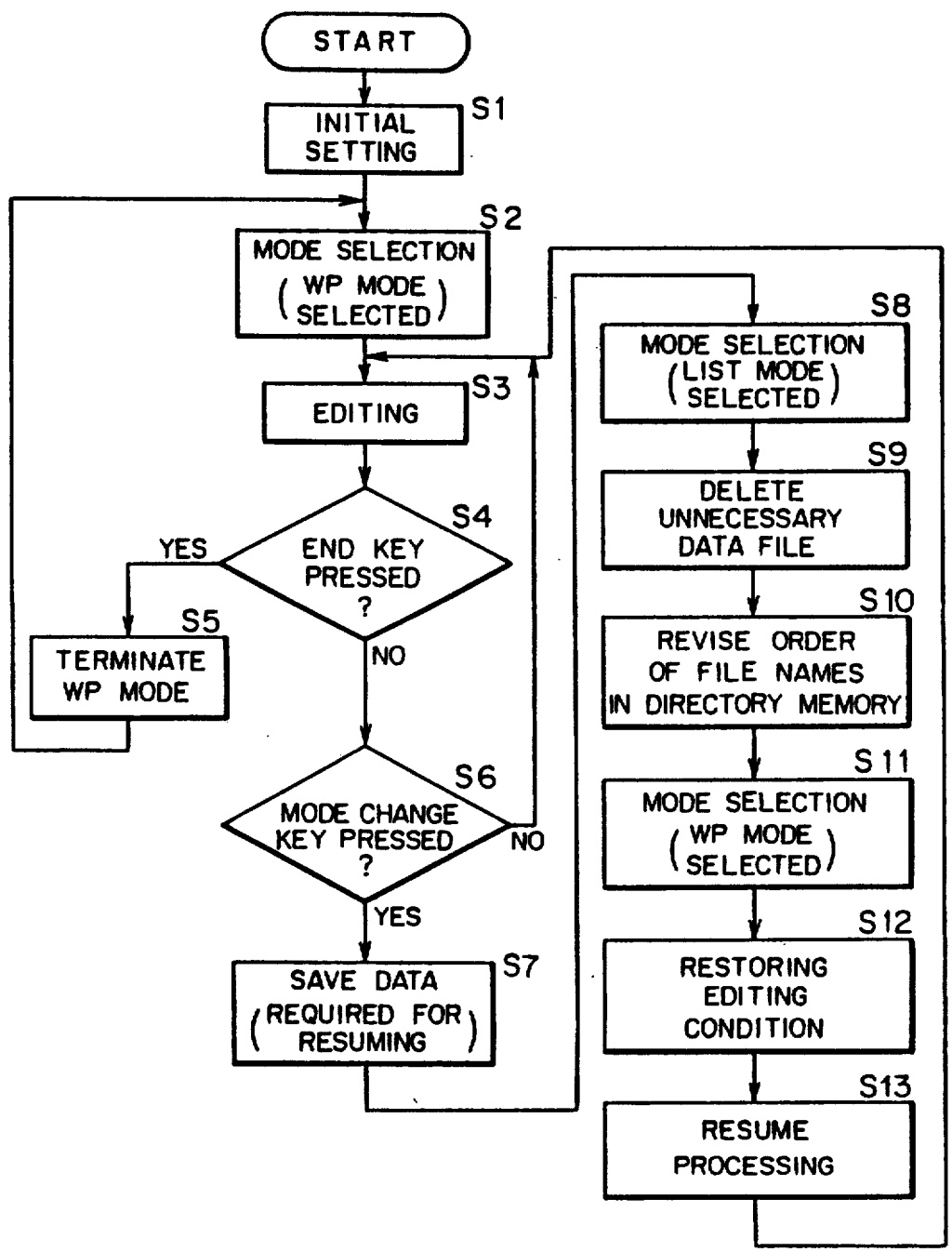
FIG. 2 is a flow chart of a mode change processing executed in the English word processor illustrated in FIG. 1.

The English word processor as above constructed operates as follows. Although many control programs are stored in the program memory 4201 of the ROM 420 as above described, the control programs in case the processing mode is changed during some processing being executed under some processing mode is hereinafter described in conjunction with FIG. 2, which is a summerized flow chart for explaining the sequential steps in case editing under the WP mode is interrupted to call up the list mode for deleting unnecessary files from the text memory 4302 and thereafter return to the WP mode.

First, when the English word processor is powered on, initial settings are completed and then "print mode" is automatically displayed on the screen of the CRT display 301 for a mode selection (Step S1: hereinafter referred to as "S1" and like symbols are used for other steps). In the meantime, additionally to the above, this English word processor is constructed such that, when the processings under some mode are terminated by pressing the end key 400, "print mode" is automatically displayed on the screen of the CRT display 301 for a next mode selection.

Upon pressing the mode change key 500 "WP mode" is displayed instead of "print mode" and upon further pressing the mode change key 500 "list mode" is then displayed, and by pressing the execution key 300 while the desired mode name is displayed on the screen of the CRT display 301 the processing mode is selected (S2). In this flow chart, "WP mode" is selected by operating the mode change key 500 and the execution key 300.

Thereafter, in S3, a desired data file is read out from the text memory 4302 and is subject to editing operations with character keys 100 and edit keys 200. During editing, if the end key 400 is pressed down (S4), the Engilish word processor leaves the WP mode (S5) and returned to the above S2.

Figure 3:
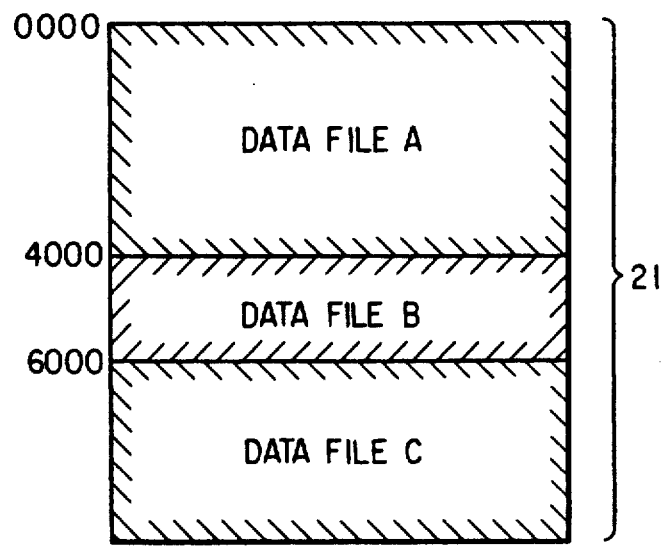
FIGS. 3(a) and 3(b) are illustrative diagrams showing an example of a text memory in the English word processor illustrated in FIG. 1.
Figure 3:
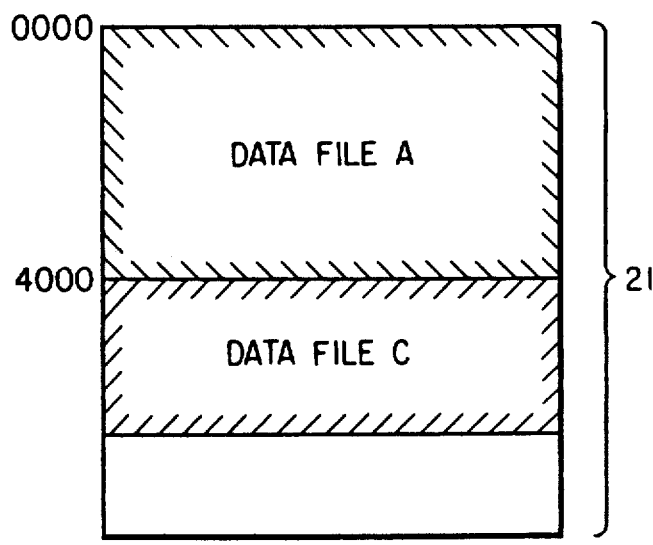

Here, assume, for instance, that the text memory 4302 is fully occupied as illustrated in FIG. 3(a) and "memory full" message is displayed on the screen of the CRT display 302 during editing operations for a data file C such as copying some data or replacing certain searched data with another designated or prepared data having more characters than the searched data, so that an operator can no longer go on editing operations at this stage and wishes to delete a data file B from the text memory 4302 to create an extra storage space therein.

In this case, if the operator presses the mode change key 500 (S6) without cancelling the processing for copying or replacing data, the processing therefor is automatically interrupted while saving the predetermined data in the predetermined memories (S7) and then "print mode" is displayed on the screen of the CRT display 301 for the next mode selection.

The predetermined data to be saved in the above S8 and the memories therefor are:

the data file name being processed when the mode change key 500 is pressed which is originally retained in the data file name memory 4304—the side memory therefor 4304s;

the start address of the above data file in the text memory 4302 which is originally retained in the start address memory 4306—the side memory therefor 4306s;

the cursor position data on the screen of the CRT display 301, which is originally retained in the cursor position memory 4309, in terms of an address starting from the start address of the above data file—the side memory therefor 4309s;

the editing operation data (copying, searching, replacing and so on) being executed at the time of the mode change key 500 being pressed—the edit condition memory 4308;

the initial character position data of the last searched and replaced data in terms of an address starting from the start address of the data file being processed if the replacing operation is being executed—the search memory 4312 and the replace memory 4314;

the initial character position data of the designated copy area in terms of an address starting from the start address of the data file being processed if the copying operation is being executed—the copy memory 4315; and the start and end position data of the display area on the display 301, which are originally retained in the display information memory 4316, in terms of addresses starting from the start address of the data file being processed—the side memory therefor 4316s.

Then, if the list mode is selected by pressing the execution key 300 (S8), a list of data file names is displayed on the screen of the CRT display 301. Choosing the data file B out of the list by moving a cursor, not shown, and pressing the execution key 500 causes the data file B to be deleted from the text memory 4302 (S9) and remaining data files are reordered in sequence in the text memory 4302 as illustrated in FIG. 3(b). Thus, an extra storage space becomes available in the text memory 4302.

With the deletion of the data file B, the file name thereof is deleted from the directory memory 2305 to revise the data concerning the order of data file names stored therein (S10).

Then, another operations of the mode change key 500 and the execution key 300 to re-select the WP mode (S11) allows restoring the interrupted editing condition as before the entry into the delete mode (S12) and resuming the interrupted editing operation (S13).

More particularly, when the mode change key 500 and the execution key 300 are operated to re-select the WP mode processing, the delete mode is automatically terminated and the WP mode is again made effective.

With this mode change, first, the data saved within the side memories 4304s, 4306s, 4309s and 4316s are transferred to the corresponding memories 4304, 4306, 4309 and 4316, respectively. Thereafter, the start address of the formerly processed data file C within the reordered text memory 4302 is calculated referring the data in the directory memory 4305 and in the data file name memory 4304, upon the result of which the data in the start address memory 4306 is altered. Based upon this altered start address data and the data in the display information memory 4316, the data displayed on the screen of the CRT disolay 302 at the time of the interruption is called back from the data file C in the text memory 4302 and re-displayed thereon with the cursor positioned according to the data in the cursor position memory 4309 and in the start address memory 4306.

Also, the data in the edit condition memory 4308, the search memory 4312, the replace memory 4314 or the copy memory 4315 of the RAM 430 are read out for preparation to resume the editing processing being executed in the WP mode before the interruption.

Thus, such processing being executed and interrupted in the above S7 as copying, searching or replacing operation automatically resumes in accordance with the data read out as above, and then returned to the above S3. The above steps can of course be repeated upon further increase of the volume of the data file C.

In the meantime, when the end key 400 is operated in the above S4 and the processings under the WP mode is terminated in the above S5 to return to the mode selection step S2, the steps required for restoring the editing conditions are, of course, not carried out and the data saved in memories relating to the data file having been processed such as those in the start address memory 4306, the end adrees memory 4307 and the edit condition memory 4310 are all cleared.

Although the series of the steps for mode-change is described in connection with the case where the text memory 4302 becomes full during editing the data file stored in the text memory 4302 in the WP mode and the processing mode is once changed to the list mode to delete one of other data files to create additional storage for the data file being processed, and then the mode is returned to the WP mode with restoring the editing condition which is interrupted by the mode-change to the list mode, it is of course possible, according to the present invention, to interrupt the processings under the WP mode and change the processing mode to a typewriter mode in which the data entered through the keyboard unit 10 are consecutively printed or any of other various processing modes such as the print mode.

This is because, when the mode change key 500 is operated during processing the data under the WP mode without pressing the end key 400 (=without terminating the WP mode), the data required for resuming the interrupted processings when the WP mode is re-selected are saved and retained until the WP mode being re-selected in the side memories 4304s, 4306s, 4309s and 4316s particularly arranged therefor as well as the data memories 4308 and 4310 through 4315. This results in enhanced operability and flexibility as well as elevated speed of processings in different processing modes.

In addition, since the data such as cursor position data and initial character position data of the area to be moved are saved in the terms of the address starting from the start address of the data file within the text memory 4302, it can be prevented that the interrupted processing is resumed in accordance with the wrong data which do not reflect the data rearrangement in the text memory 4302 occured if some data file is deleted therefrom.

In the meantime, while in the above explanations the data required for resuming the interrupted processings are saved in the corresponding memories upon the operation of the mode change key 500, it may of course be modified to always retain those data in the corresponding memories during processing under the WP mode.

Further, although the above embodiment is concerned with the mode change from the WP mode to the list mode in the English word processor, the present invention can of course be applied to other mode-changes from one mode to another as well as in other data processing systems such as Japanese word processors and general computers.

What is claimed is:

1. A data processing system having a plurality of data processing operation modes and a text memory for storing a plurality of data files comprising:

mode select means for selecting an operation mode;
   mode changing means for interrupting a processing being executed under a data input/edit mode and changing modes to enable processing in a selected mode;
   data memory means for saving required data to permit the interrupted processing to continue in said data input/edit mode at the point of interruption, said data memory means comprising:
   a data file name memory for saving a data file name of a currently processed data file under said data input/edit mode;
   a start address memory for saving a start address of said currently processed data file in said text memory, and
   an edit condition memory for saving editing conditions being executed under said data input/edit mode; and
   resuming means for resuming the interrupted processing in said data input/edit mode based upon said data saved in said data memory means when said data input/edit mode is reselected by said mode select means after said processing executed under said selected mode.

2. The system according to claim 1 wherein said data memory means further comprises an end address memory for saving an end address of said currently processed data file in the text memory.

3. The system according to claim 1 which further comprises display means for displaying data to be processed on a display screen thereof, and wherein said data memory means further comprises:
   a cursor position memory for saving a position data of a cursor on said screen; and
   a display information memory for saving start and end addresses of an area currently displayed on said screen.

4. The system according to claim 3 wherein said position data of the cursor on the screen and said start and end address of the area currently displayed on the screen are saved in said cursor position memory and said display information memory, respectively, in terms of addresses starting from said start address of the currently processed data file in the text memory.

5. The system according to claim 3 which further comprises search means for searching certain data included in said currently processed data file and replace means for replacing said certain data searched by said search means with other data, both of said search means and said replace means being effective in case said input/edit mode is selected, and wherein said data memory means further comprises:
   a search data memory for saving data to be searched;
   a search memory for saving a start address of last searched data;
   a replace data memory for saving data to be replaced; and
   a replace memory for saving a last replaced position data.

6. The system according to claim 5 wherein data representing said start address and said last replaced position are stored in said search memory and said replace memory, respecively, in terms of an address starting from said start address of the currently processed data file in the text memory.

7. The system according to claim 3 further comprises move means for moving data included in a designated area of said currently processed data file to another location if said move means being effective in case said input/edit mode is selected, and wherein said data memory means further comprises a move memory for saving a starting position data of said designated area.

8. The system according to claim 7 wherein said starting position data is saved in said move memory in terms of an address starting from said start address of the currently processed data file in the text memory.

9. The system according to claim 3 which further comprises copy means for copying data included in a designated area of said currently processed data file to other location, said copy means being effective in case said input/edit mode is selected, and wherein said data memory means further comprises a copy memory for saving a starting position data of said designated area.

10. The system according to claim 9 wherein said starting position data is saved in said copy memory in terms of an address starting from said start address of the currently processed data file in the text memory.

11. The system according to claim 3 wherein said data memory means further comprises a series of side memories for saving the data transferred from said data file name memory, said start address memory, said cursor position memory and said display information memory, and said data are transferred to said side memories when mode change is carried out without terminating processings under said input/edit mode.

12. A data processing system comprising:
data file memory means for storing a plurality of data files;
input means for inputting data
mode change means for processing modes at least between a data input mode for storing input data in said data file memory means and a delete mode for deleting a selected data file stored in said data file memory means and rearranging addresses of remaining data files in said data file memory means;
access data memory means for storing an address corresponding to an access position in the data file being processed under said data input mode;
address data memory means for storing a data indicating a start address of said data file being processed under said data input mode in said data file memory means;
revising means for correspondingly revising said data stored in said address data memory means if the start address of said data file is changed during the processing under said delete mode; and
resuming means for resuming the processing being executed under the previous data input mode based upon the data stored in said address data memory means and said access data memory means when the mode is returned to the data input mode from other mode by said mode change means.

13. The system according to claim 12 which further comprises:
display means for displaying a cursor and data to be processed on a display screen thereof;
a cursor position memory for saving a position data of said cursor displayed on said screen in terms of an address starting from said start address of the currently processed data file in the data file memory means; and
a display information memory for saving start and end addresses of an area currently displayed on the screen of said display means in terms of addresses starting from said start address of the currently processed data file in the data file memory means.

14. The system according to claim 13 which further comprises a data file name memory for saving a data file name of a currently processed data file.

15. The system according to claim 14 which further comprises a series of side memories for saving the data transferred from said data file name memory, said start address memory, said cursor position memory and said display information memory, and said data are transferred to said side memories when mode chage is carried out without terminating processings under said input mode.

16. The system according to claim 13 which further comprises:
search means for searching certain data included in said currently processed data file;
replace means for replacing said certain data both of the search means and said replace means being effective in case said input/edit mode is selected, searched by said search means with other data;
a search data memory for saving data to be searched;
a search memory for saving a start address of last searched data in terms of an address starting from said start address of the currently processed data file in the data file memory means;
a replace data memory for saving data to be replaced; and
a replace memory for saving a last replaced position data in terms of an address starting from said start address of the currently processed data file in the data file memory means.

17. The system according to claim 13 which further comprises:
move means for moving data included in a designated area of said currently processed data file to another location, said move means being said input means; and
a move memory for saving data representing a starting position data of said designated area in terms of an address starting from said start address of the currently processed data file in the data file memory means.

18. The system according to claim 13 which further comprises:
copy means for copying data included in a designated area of said currently processed data file to another location said copy means being said input means;
a copy memory for saving a starting position data of said designated area in terms of an address starting from said start address of the currently processed data file in the data file memory means.

19. A data processing system comprising:
a text memory for storing a plurality of data files;
mode change means for interrupting a processing being executed under a first selected mode and changing processing modes to a second selected one;
data memory means for saving required data for resuming the interrupted processing;
address data memory means for storing data indicating a start address of a data file in the text memory being processed under said first selected mode;
access data memory means for storing an address corresponding to an access position in said data file being processed under said first selected mode, said address being stored as an address starting from the start address of the data file;
revising means for correspondingly revising said data stored in said address data memory means if the start address of said data file is changed during the processing under said second selected mode; and resuming means for resuming the interrupted processing based upon said data saved in said data memory means as well as the data stored in said address data memory means and said access data memory means when said first selected mode is re-selected.

20. The system according to claim 19 wherein said first selected mode is a data input/edit mode and said data memory means comprises:

a data file name memory for saving a data file name of a currently processed data file;

a start address memory for saving a start address of said currently processed data file in said text memory, and an edit condition memory for saving editing conditions being executed.

21. The system according to claim 20 wherein said data memory means further comprises an end address memory for saving an end address of said currently processed data file in the text memory.

* * * * *